UNITED STATES PATENT OFFICE.

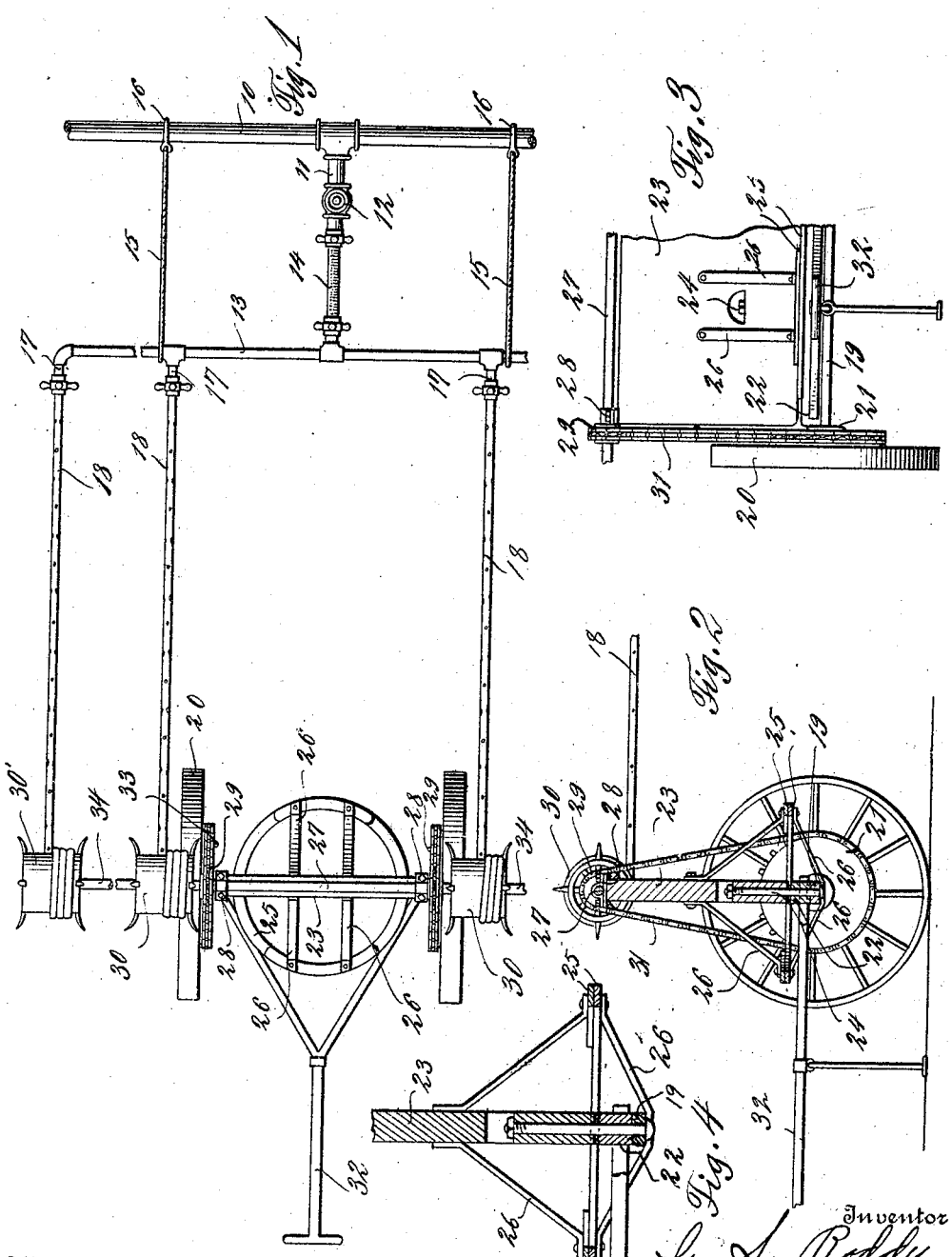

ISHAM L. RODDY, OF ESTES, TEXAS.

IRRIGATION APPARATUS.

1,014,521.  Specification of Letters Patent.  Patented Jan. 9, 1912.

Application filed July 29, 1910. Serial No. 574,549.

*To all whom it may concern:*

Be it known that I, ISHAM L. RODDY, a citizen of the United States, residing at Estes, in the State of Texas, have invented certain new and useful Improvements in Irrigation Apparatus, of which the following is a specification.

This invention relates to farming utensils and is designed to construct an apparatus whereby the ground may be irrigated.

It also contemplates the construction of an irrigation apparatus which may be wound about a reel and adjusted to various sizes of fields.

With the above and other objects in view, this invention consists in the construction, combination, and arrangement of parts, all as hereinafter more fully described, claimed, and illustrated in the accompanying drawings, wherein—

Figure 1 is a top plan view of a device constructed in accordance with the present invention; Fig. 2 is a central vertical section of the hose cart; Fig. 3 is a fragmentary elevation thereof; Fig. 4 is an enlarged sectional view bringing out more clearly the king-bolt connection between the axle and bolster block.

The irrigation apparatus forming the subject matter of the present invention comprises a main supply pipe located along one side of a field, said pipe having a series of branch pipes throughout its entire length. An auxiliary pipe is secured to said supply pipe through the instrumentality of one of said branch pipes and carries a plurality of hose, the opposite terminals of said hose being connected to reels carried by the hose cart. The hose are perforated and are elevated above the plants in such a manner that the water passing through the perforations thereof descends directly upon the leaves and roots of the vegetation in a manner similar to rain. The hose carriage may be turned to wind the hose upon the reels thereof in such a manner that the hose will be in no way twisted.

In carrying out the present invention a supply pipe 10 is located on one side of a field or the like and is provided with a series of spaced branch pipes 11 each of said branch pipes being provided with the valve 12. The pipe 13 is connected to any one of the branch pipes 11 through the instrumentality of the flexible connection 14 while the extremities of the pipe 13 are secured to the pipe 10 by the hangers 15 which engage the pipe 10 by the hooks 16 carried at the outer terminals thereof. A series of nipples 17 project from the pipe 13 to which are secured the perforated hose 18 which at their free terminals are wound about the reels carried by the hose cart. The hose cart comprises an axle 19 at each terminal of which is mounted a wheel 20. A sprocket wheel 21 is located adjacent to the inner side of each wheel 20 and is adapted to coöperate with its respective wheel for winding and unwinding the hose. A bolster block 22 is mounted on the axle 19 and has the supporting vertical frame 23 pivotally mounted thereon through the instrumentality of the king bolt 24, said bolster block and supporting vertical frame having the turning plates 25 interposed therebetween. A series of braces 26 extend from the axle 19 and the vertical frame 23 to the turning plates thereby retaining said frame in a normally vertical position.

A shaft 27 is longitudinally mounted on the upper edge of the vertical frame 23 through the instrumentality of the bearings 28, said shaft being provided with the sprocket wheels 29 adjacent to each end of the frame 23. A reel 30 is carried by the shaft 27 adjacent to each sprocket wheel 29 and is adapted to be rotated upon the rotation of the shaft thereby causing the reels to wind and unwind according to the direction in which the hose cart is traveling. This rotation is imparted to the shaft 27 by the sprocket chain 29 which passes about each pair of the sprocket wheels 21 and 29. A draft bar 32 is secured to one side of the bolster 22. After the hose 18 have been unwound by the cart traveling in one direction the chains 31 are elevated from the sprocket gears 21 by loosening a pin 33 in each chain thereby permitting the axle 19 to be rotated about the king bolt as a pivot retaining the frame 23 stationary. It will be seen that when the chains are again placed upon the sprocket wheels the draft gear 32 will be pointing in an opposite direction to the original direction of travel thus causing the hose to be wound about the reels 30 when the apparatus is drawn in the new direction. An extension 34 may be provided for the shaft 27 in order that an extra reel 30′ may be carried at each end thereby coöperating with an additional hose.

Having thus described my invention, what is claimed as new is:—

1. In irrigating apparatus, the combination of a plurality of hose, a hose truck embodying ground wheels, a plurality of reels mounted on said truck connected to and adapted to carry said hose, draft means secured to the truck for advancing the same, means for operating the reels from the ground wheels, and means whereby said draft means may be reversed without changing the position of said reels, to thereby reverse the direction of rotation of the reels on movement of the truck, for winding the hose.

2. In irrigating apparatus, the combination with a supply pipe, of a plurality of hose secured at one end thereto, a wheeled hose truck, a plurality of reels carried by said truck connected to the other ends of the hose, means for driving the reels from the wheels of the truck when the latter is in motion, draft means connected to the truck and normally extending therefrom in a direction opposite the hose for moving the truck to unwind the hose from the reels, means connecting the truck to the reels so as to permit the truck and its draft means to be reversed with respect to the hose, and detachable means normally operably connecting the driving means to the reels thereby preventing the reversal of the truck with respect to the hose.

3. In combination, a stationary supply pipe, an irrigating apparatus associated therewith including an auxiliary supply pipe, a plurality of hose connected at one end to said auxiliary supply pipe, a truck embodying ground wheels, a plurality of reels mounted on said truck and connected to the other ends of the hose, a draft member connected to the truck for advancing the same and normally extending therefrom in a direction opposite the hose aforesaid, driving connections for transmitting motion from the ground wheels to the reels, whereby when the truck is advanced the hose will be unwound from the reels, means so connecting the truck with the reels as to permit the truck and its draft means to be reversed without changing the positions of the reels, whereby to wind the hose thereon, and detachable members normally holding the driving connections aforesaid in operative relation to the reels thereby normally preventing the reversal of the truck and draft means, as above set forth.

In testimony whereof I affix my signature in presence of two witnesses.

ISHAM L. RODDY.

Witnesses:
J. A. BRUNDREW,
DAVID M. PICTON.